United States Patent
Matlack et al.

(10) Patent No.: US 12,105,531 B2
(45) Date of Patent: *Oct. 1, 2024

(54) JOINT OPTIMIZATION OF ROBOTIC VEHICLE ROUTING FOR RIDE QUALITY, SAFETY, AND OPERATOR DEMAND

(71) Applicant: GM Cruise Holdings LLC, San Francisco, CA (US)

(72) Inventors: Charles Bruce Matlack, San Francisco, CA (US); Sarah Rizk, San Francisco, CA (US); Linsen Chong, San Francisco, CA (US); Zsolt Parnaki, Sunnyvale, CA (US); Chen Xie, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/965,620

(22) Filed: Oct. 13, 2022

(65) Prior Publication Data
US 2023/0033518 A1    Feb. 2, 2023

Related U.S. Application Data

(63) Continuation of application No. 16/876,568, filed on May 18, 2020, now Pat. No. 11,500,372.

(51) Int. Cl.
*B60W 60/00* (2020.01)
*G01C 21/34* (2006.01)
*G05D 1/221* (2024.01)

(52) U.S. Cl.
CPC ......... *G05D 1/221* (2024.01); *B60W 60/0025* (2020.02); *B60W 60/0059* (2020.02); *G01C 21/3407* (2013.01); *G01C 21/3453* (2013.01); *B60W 2556/45* (2020.02)

(58) Field of Classification Search
CPC .. G05D 1/0011; G05D 1/0027; G05D 1/0038; G05D 1/0212; G05D 1/0214; G05D 1/221–2271; B60W 60/0013–00139; B60W 60/0011; B60W 60/001; B60W 60/0025; B60W 60/00253; B60W 60/0059; B60W 2556/50; G01C 21/3407; G01C 21/3415; G01C 21/3446; G01C 21/3453; G01C 21/3461
See application file for complete search history.

(56) References Cited

U.S. PATENT DOCUMENTS

| 11,500,372 B2 * | 11/2022 | Matlack | G05D 1/0011 |
| 2018/0231982 A1 | 8/2018 | Yunoki et al. | |
| 2019/0056733 A1 * | 2/2019 | Ferguson | G07F 17/12 |

(Continued)

OTHER PUBLICATIONS

U.S. Appl. No. 16/876,568, Office Action dated Mar. 25, 2022, 21 pages.

*Primary Examiner* — Spencer D Patton

(57) ABSTRACT

Systems, methods, and computer-readable media are provided for determining operator availability to provide remote assistance to an autonomous vehicle, determining which of a first plurality of routes will provide a positive ride experience based on the operator availability, and selecting a route of the first plurality of routes for a user based on the determining of which of the first plurality of routes will provide a positive ride experience.

17 Claims, 6 Drawing Sheets

(56) References Cited

U.S. PATENT DOCUMENTS

2019/0186936 A1\* 6/2019 Ebner ................ G01C 21/3822
2020/0272949 A1 8/2020 Chen et al.
2022/0011767 A1 1/2022 Nicodemus et al.

\* cited by examiner

JOINT OPTIMIZATION OF ROBOTIC VEHICLE ROUTING FOR RIDE QUALITY, SAFETY, AND OPERATOR DEMAND

CROSS-REFERENCE TO RELATED APPLICATIONS

This application is a continuation and claims the benefit of U.S. application Ser. No. 16/876,568, filed on May 18, 2020, entitled "JOINT OPTIMIZATION OF ROBOTIC VEHICLE ROUTING FOR RIDE QUALITY, SAFETY, AND OPERATOR DEMAND," the entire contents of which is expressly incorporated by reference herein in its entirety for all purposes.

BACKGROUND

1. Technical Field

The subject technology provides solutions for route optimization, and in particular, for optimizing route selection based on operator demand.

2. Introduction

Location-specific autonomous vehicle driving hazards can utilize blacklists that forbid traversal of corresponding road segments and avoid certain areas, thereby forbidding traversal unless that particular road segment is the only path to a destination. Blacklists are inherently a very coarse tool because such tools operate with "black and white" operating rules that are not practical under many real-time driving situations.

In these circumstances, when the autonomous vehicle is unable to decide which road segment to traverse, remote assistance from an operator is requested to complete the traversal of the blacklisted road segment. For most simple road segments, there is a low likelihood of requiring remote assistance. However, the likelihood of requiring remote assistance will vary greatly during particular time periods (e.g., rush hour), under traffic conditions (e.g., illegally parked delivery vehicle), and based on unknown customer demand.

As such, a need exists for a system and a method that can efficiently and effectively provide a route selection process that can take into account operator demand and availability, thereby allowing for rapid and efficient route selection.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Figure 1:
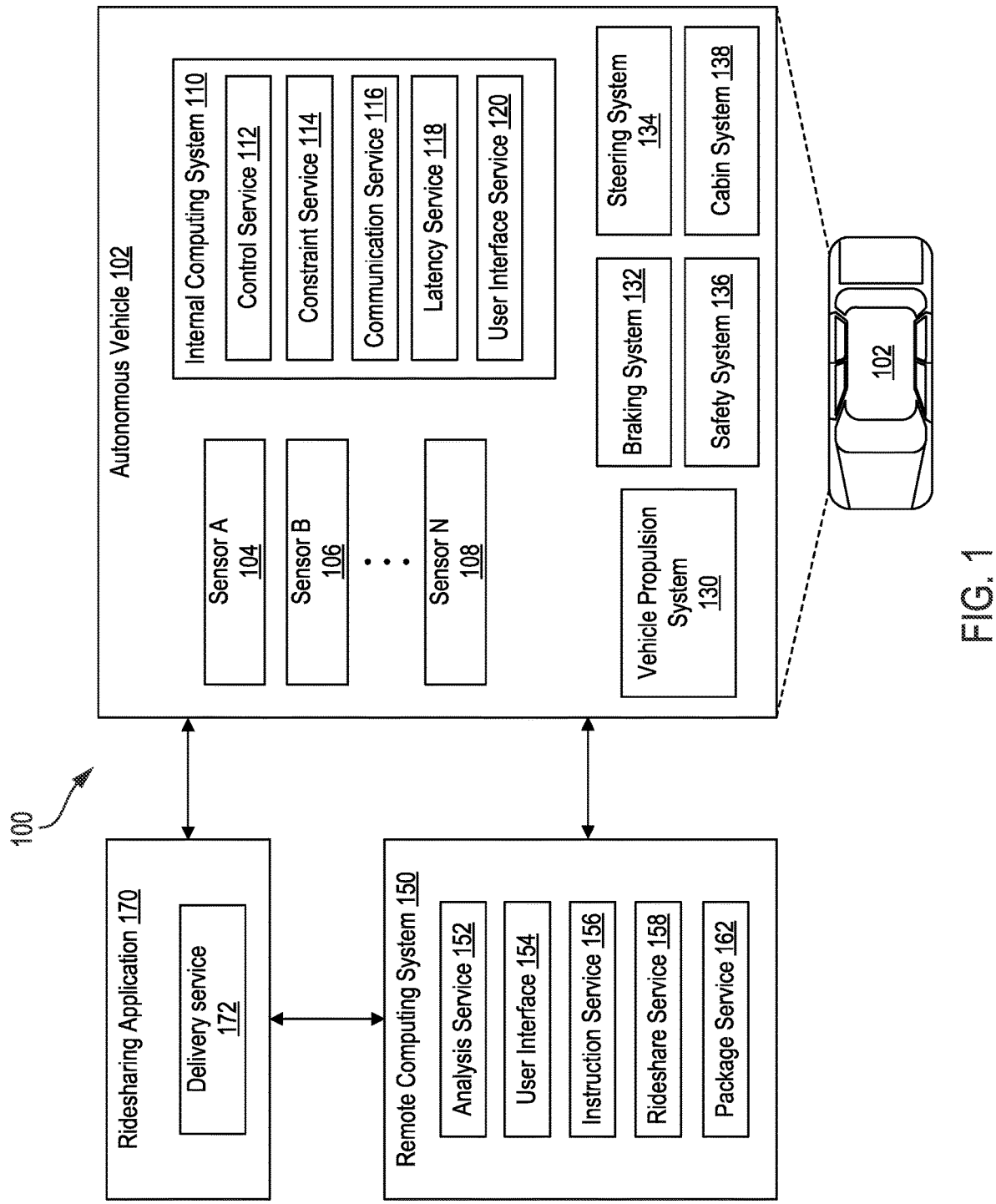
FIG. 1 illustrates an example environment that includes an autonomous vehicle in communication with a remote computing system, according to some aspects of the disclosed technology.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), 3rd Generation (3G), 5th Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Location-specific autonomous vehicle driving hazards can utilize blacklists that forbid traversal of corresponding road segments and avoid certain areas, thereby forbidding traversal unless that particular road segment is the only path to a destination. Blacklists are inherently a very coarse tool because such tools operate with "black and white" operating rules that are not practical under many real-time driving situations.

In these circumstances, when the autonomous vehicle is unable to decide which road segment to traverse, remote assistance from an operator is requested to complete the traversal of the blacklisted road segment. For most simple road segments, there is a low likelihood of requiring remote assistance. However, the likelihood of requiring remote assistance will vary greatly during particular time periods (e.g., rush hour), under traffic conditions (e.g., illegally parked delivery vehicle), and based on unknown customer demand.

As such, a need exists for a system and a method that can efficiently and effectively provide a route selection process that can take into account operator demand and availability, thereby allowing for rapid and efficient route selection. The system and the method described herein are not limited to blacklisted areas. For example, a specific description of areas that trigger a remote assistance session can include any version of areas with costing applied, a subset of blacklists (e.g., forbid pathing through), graylists (e.g., high fixed cost), and any other defined area with gradient costing. Remote assistance operators can be utilized to traverse areas defined as requiring remote assistance independent of blacklists, graylists, etc. Moreover, areas that trigger a remote assistance session can include a broad formulation that applies to any area with adverse events. These areas can be defined geographically, temporally, and/or based on scene attributes (e.g., pedestrian density, etc.).

Figure 2:
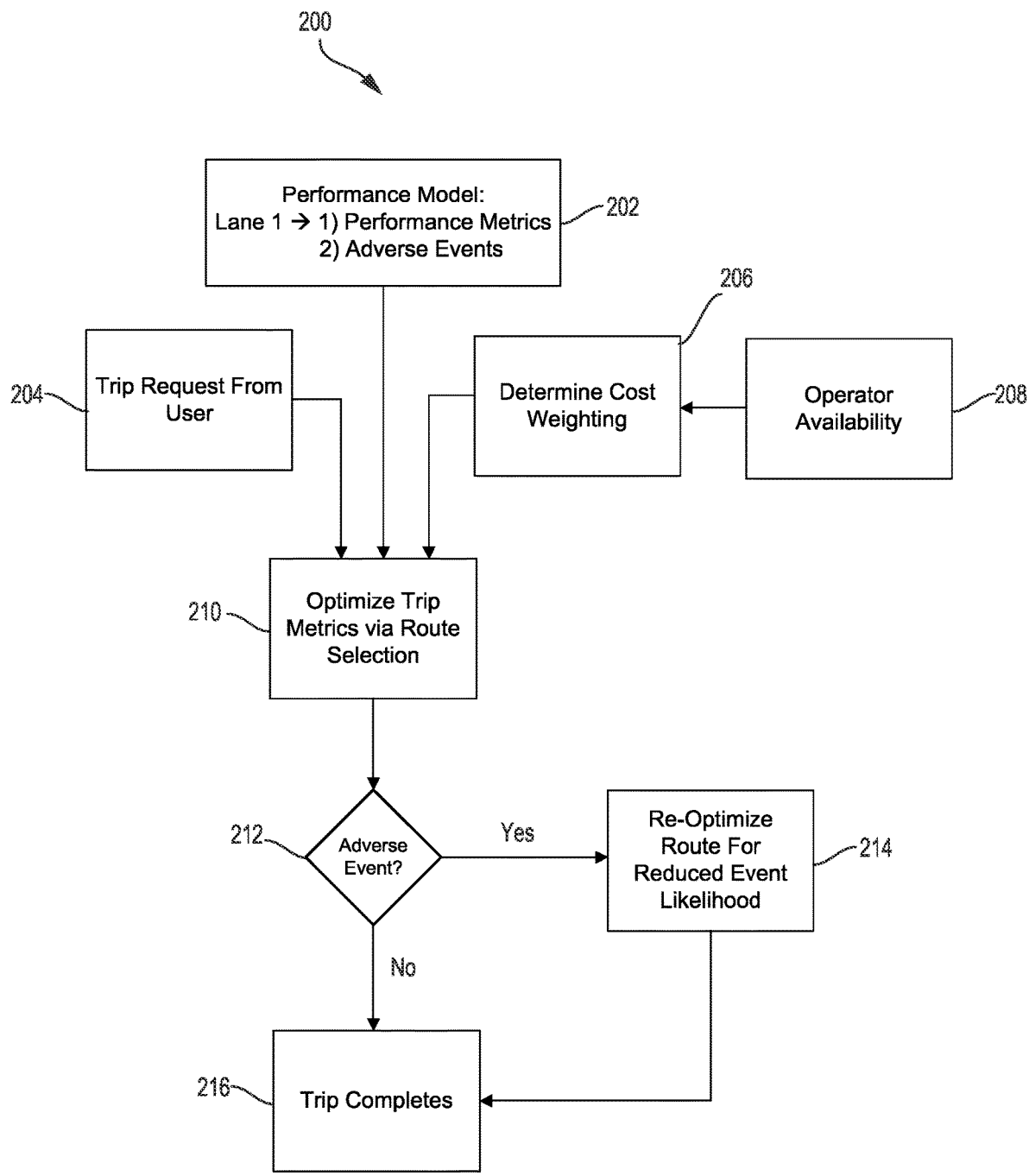
FIG. 2 illustrates an example flow chart of an operator availability route selection system, according to some aspects of the disclosed technology.

FIG. 2 illustrates an example flow chart of an operator availability route selection system 200, according to some aspects of the disclosed technology. In some instances, the route selection system 200 can inform and update a roadmap of an autonomous vehicle for building a route planner, which may prioritize optimization for distance to avoid high-risk road segments. In other instances, the route selection system 200 can provide real-time routing choices of autonomous vehicles 102 by taking into consideration the likelihood of a safety event and the likelihood of needing remote assistance (and real-time remote assistance operator availability), while also taking into consideration basic performance metrics including trip time and distance. The route selection system 200 can maximize positive rider experience while maintaining or reducing remote assistance operator staffing costs.

Preparation of a Performance Model:

In some instances, a performance model 202 can include compiling and maintaining historical data on autonomous vehicle performance and adverse events as performance metrics and rates of adverse events. Performance metric can include time duration, takeovers, SCEs/pre-SCEs, ride comfort, and transit time for each lane_id (e.g., lane 1) or lane triplet, or a combination of a lane identifier and a time period (e.g., time of day and day of week).

In other instances, the performance model 202 can utilize an algorithm to generate a predictive model of the above-referenced performance metrics and rates of adverse events as a function of lane_id or lane triplet, or a combination of a lane identifier and a time period (e.g., time of day and day of week).

In some cases, the performance model 202 can determine maximum admissible adverse event likelihoods, particularly for safety-related events, and a minimum ("service quality threshold") for the performance-related metrics. For example, for a given trip request, a representative sample of trip requests (e.g., 10,000 market-weighted) optionally can be repeated to capture different time-of-day traffic conditions, the performance model 202 can determine the autonomous vehicle routes that optimize a weighted sum of performance metrics while satisfying expected adverse event constraints.

The performance model/adverse event model 202 can marginally be adjusted based on real-time adverse events and/or real-time information about traffic conditions. In some cases, autonomous vehicle route selections can be made in real-time in order to maximize potential performance, while matching remote assistance operator availability.

Optimization of Trip Metrics Via Route Selection:

In some instances, the route selection system 200 can take into consideration a trip request 204 generated by a user such as a mobile application user or an application user. The trip request can include a pick-up location and a destination location such that the route selection system 200 can prepare optimizing the route selection 210 of the autonomous vehicle 102.

In some cases, the optimization of trip metrics 210 can further include changing the cost function weighting 206 assigned to the likelihood of remote assistance events, or apply a constraint to the maximum remote assistance likelihood based on the number of available remote assistance operators (or a recent time-averaged value), and the number of autonomous vehicles 102 expected to be engaged in the near future.

In other cases, the optimization of trip metrics 210 can adjust route planner settings to require the autonomous vehicle 102 to take a more conservative route that may be of a greater distance, but which decreases the likelihood of requiring remote assistance when only a few number of operators are available at a given time 208; or take a more aggressive route that is more direct and faster, but only when there are plenty of remote assistance operators that are available to service remote assistance requests 208.

Figure 3:
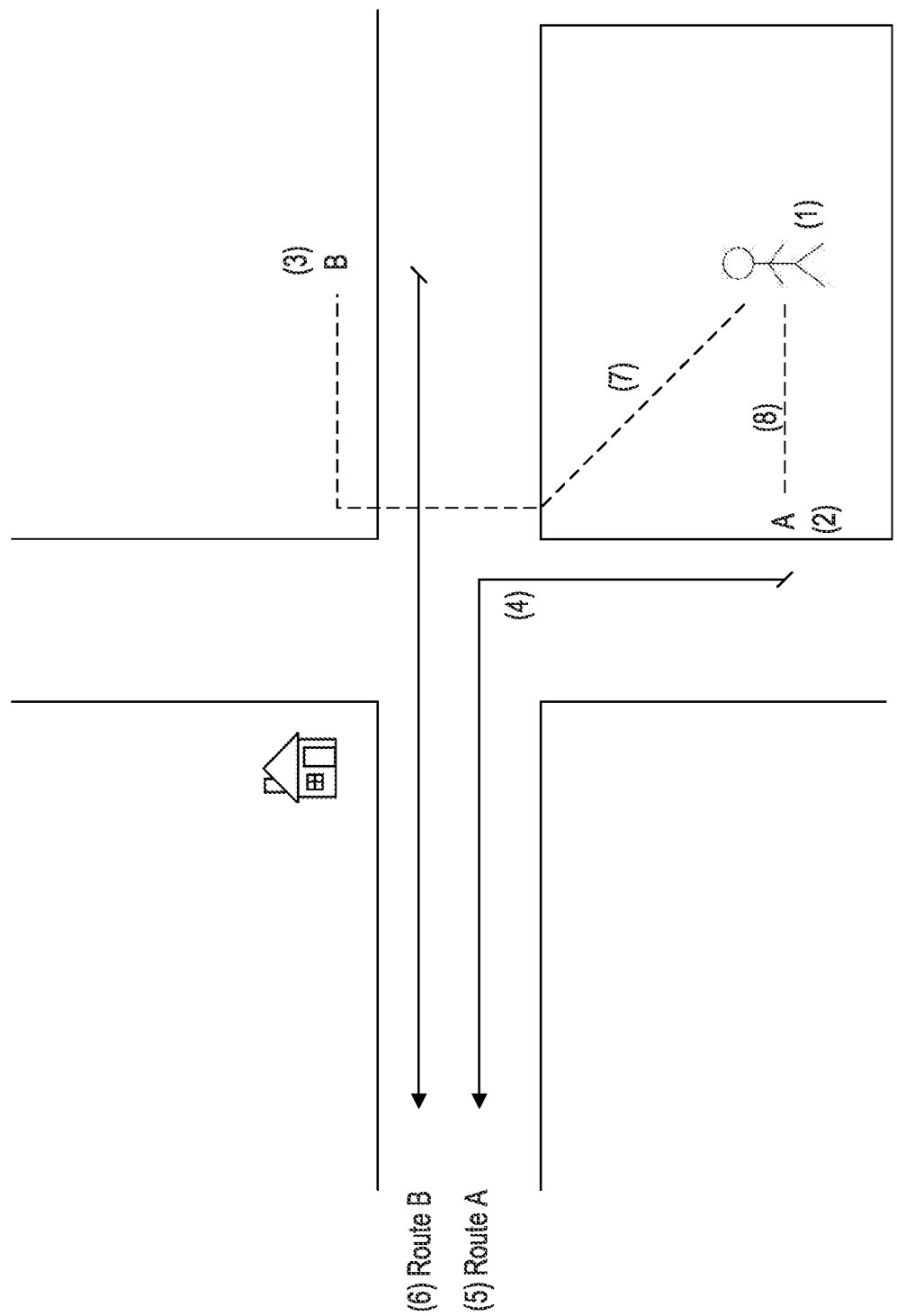
FIG. 3 illustrates an example topology of a route selection system, according to some aspects of the disclosed technology.

In some instances, the route selection system 200 can perform the routing optimization 210 for each of a set of admissible pull-over locations near the trip request origin (as shown in FIG. 3 at A and B). After a weighted route selection is determined, the route selection system 200 can indicate to the user which candidate pick-up location is recommended based on optimizing the weighted performance function for the entire ride. In other instances, the route selection system 200 can add a cost component for the estimated walking path required of the user (as shown in FIG. 3 at (7) and (8)). The route selection system 200 can also take into public transit trip plans involving walking to minimize total trip time and unique risk and performance expectation models.

In other instances, the route selection system 200 can change the route planner optimization weightings while executing a route. For example, if the autonomous vehicle 102 experiences an adverse event 212, the route selection system 200 can include re-optimizing the route for a reduced event likelihood 214. A goal of the route selection system 200 may be to salvage predictability of the ride experience and to include a positive conclusion to the rider experience 216.

For example, the selected route can include a tradeoff in the expected ride duration by increasing the ride duration since the previously expected ride duration failed, but by providing a positive conclusion to the rider experience 216 by averting the adverse event. In some cases, the route selection system 200 may provide the user with a choice to invoke the routing re-prioritization 214 via an in-car or an in-app button (e.g., "Take the scenic route"). In other cases, re-prioritizing routing selections 214 can be made in real-time in order to preserve/salvage customer experience in view of an adverse customer event (e.g., being stuck behind a delivery service vehicle).

The route selection system 200 can utilize service area restrictions and nuanced cost/weighted functions instead of only utilizing within-route blacklists and avoidance areas to sufficiently avoid driving on road segments that risk poor performance/user experience and adverse events.

FIG. 3 illustrates an example topology of a route selection system, according to some aspects of the disclosed technology.

In some cases, a user (1) can request a trip to be picked up by an autonomous vehicle 102 utilizing the route selection system 200. The route selection system 200 can identify admissible pullover locations A (2) and B (3) that respectively correspond to Route A (5) that includes a risky left-turn maneuver (4) and Route B (6) that includes a longer walking distance (7) for the user, as compared to the walking distance (8) for pickup location A (2). The route selection system 200 can recommend that the user (1) select pickup location B (3) in order to optimize the overall trip experience. However, if the risky left-turn maneuver (4) can be navigated via remote operator and the availability of remote operators is plentiful, then pickup location A (2) can be recommended to the user (1).

Figure 4:
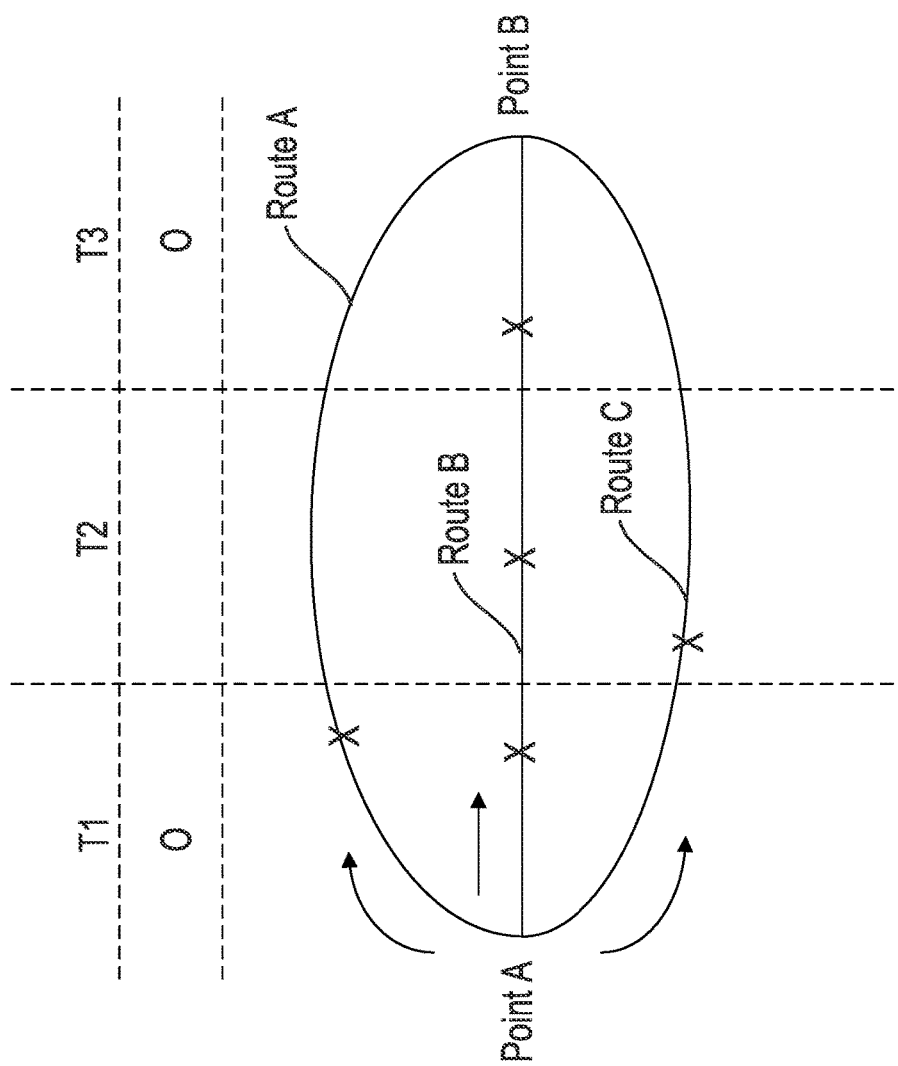
FIG. 4 illustrates an example topology of route selection, according to some aspects of the disclosed technology.

FIG. 4 illustrates an example topology of route selection, according to some aspects of the disclosed technology. For example, FIG. 4 illustrates three paths: Route A, Route B, and Route C that a user can travel in the autonomous vehicle 102. Routes A, B, and C travel from Point A to Point B. Along each route, there may be adverse events represented by an "X" and may include car accidents, parked car, illegally parked delivery service vehicle, open fire hydrant, downed electrical power line, or any other such adverse event suitable for the intended purpose and understood by a person of ordinary skill in the art.

FIG. 4 is also divided into three time segments including T1, T2, and T3. "O" represents operator availability for remote assistance at a given time segment. As shown in FIG. 4, operators are available at T1 and T3, but not at T2. Route A includes one adverse event at T1 with an available operator for assistance; Route B includes three adverse events with the adverse event at T2 having no available operator for assistance; and Route C includes one adverse event at T2 having no available operator for assistance. In some instances, Route B would be the path to select for the user because it includes the shortest distance between Point A and Point B. However, Route B includes three adverse events with no available operator for the foreseeable future. As such, Route B may actually be the longest trip (by time) and may provide the worst ride experience to the user.

In other instances, Route C has available operators at T1 and T3, however, the adverse event is within T2 and not T1 and T3. As such, the available operators at T1 and T3 are unhelpful to optimize the route selection to provide a positive ride experience. In Route A, the adverse event is in T1, but the route selection system 200 knows that an operator is available in the same time segment. As such, if the adverse event of Route A does cause an issue to the ride experience, the route selection system 200 will already be prepared to request remote assistance knowing that an operator is available to assist the user.

Figure 5:
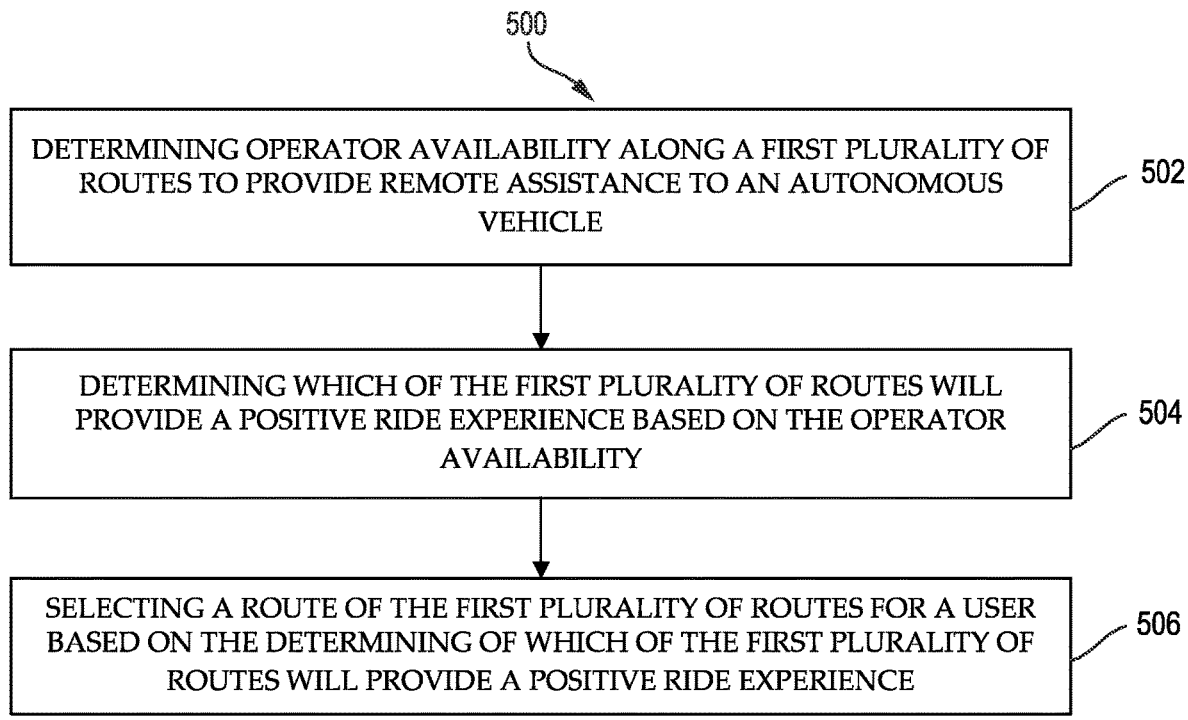
FIG. 5 illustrates an example process for providing a route selection based on operator availability, according to some aspects of the disclosed technology.

Having disclosed some example system components and concepts, the disclosure now turns to FIG. 5, which illustrates an example method 500 for selection of a route based on operator availability. The steps outlined herein are exemplary and can be implemented in any combination thereof, including combinations that exclude, add, or modify certain steps.

At step 502, the method 500 can include determining operator availability to provide remote assistance to an autonomous vehicle. The determining of the operator availability can include determining at which time segments operators are available to provide the remote assistance.

In some instances, the method 500 can optimize trip metrics by adjusting route planner settings to require the autonomous vehicle to take a more conservative route that may be of a greater distance, but which decreases the likelihood of requiring remote assistance when only a few number of operators are available at a given time; or take a more aggressive route that is more direct and faster, but only when there are plenty of remote assistance operators that are available to service remote assistance requests.

At step 504, the method 500 can include determining which of a first plurality of routes will provide a positive ride experience based on the operator availability. The determining of which of the first plurality of routes will provide the positive ride experience can further be based on a performance model. The performance model can include performance metrics and potential adverse events.

In other instances, a performance model can include compiling and maintaining historical data on autonomous vehicle performance and adverse events as performance metrics and rates of adverse events. Remote assistance can also include time duration, takeovers, SCEs/pre-SCEs, ride comfort, and transit time (e.g., time of day and day of week) for each lane_id (e.g., lane 1) or lane triplet.

In some instances, the method 500 can provide real-time routing choices of autonomous vehicles by taking into consideration the likelihood of a safety event and the likelihood of needing remote assistance (and real-time remote assistance operator availability), while also taking into consideration basic performance metrics including trip time and distance. The method 500 can maximize positive rider experience while maintaining or reducing remote assistance operator staffing costs.

In other instances, the method 500 can take into consideration a trip request generated by a user such as a mobile application user or an application user. The trip request can include a pick-up location and a destination location such that the method 500 can include optimizing route selection of the autonomous vehicle.

At step 506, the method 500 can include selecting a route of the first plurality of routes for a user based on the determining of which of the first plurality of routes will provide a positive ride experience.

The method 500 can further include determining a cost weight for each available operator to assist in the selecting of the route of the first plurality of routes. In some instances, the method 500 can include changing the cost function weighting assigned to the likelihood of remote assistance events, or apply a constraint to the maximum remote assistance likelihood based on the number of available remote assistance operators (or a recent time-averaged value), and the number of autonomous vehicles 102 expected to be engaged in the near future.

In some instances, the method 500 can include determining whether an adverse event is present along the route selected for the user. The method 500 can also include determining which of a second plurality of routes will reduce an adverse event likelihood based on the determining of whether the adverse event is present.

In other instances, the method 500 can change the route planner optimization weightings while executing a route. For example, if the autonomous vehicle experiences an adverse event, the method 500 can include re-optimizing the route for a reduced event likelihood. The method 500 may salvage predictability of the ride experience and include a positive conclusion to the rider experience.

In some cases, the method 500 can include determining maximum admissible adverse event likelihoods, particularly for safety-related events, and a minimum ("service quality threshold") for the performance-related metrics. For example, for a representative sample of trip requests (e.g., 10,000 market-weighted) that optionally can be repeated to capture different time-of-day traffic conditions, the performance model can determine the autonomous vehicle routes that optimize a weighted sum of performance metrics while satisfying expected adverse event constraints.

Figure 6:
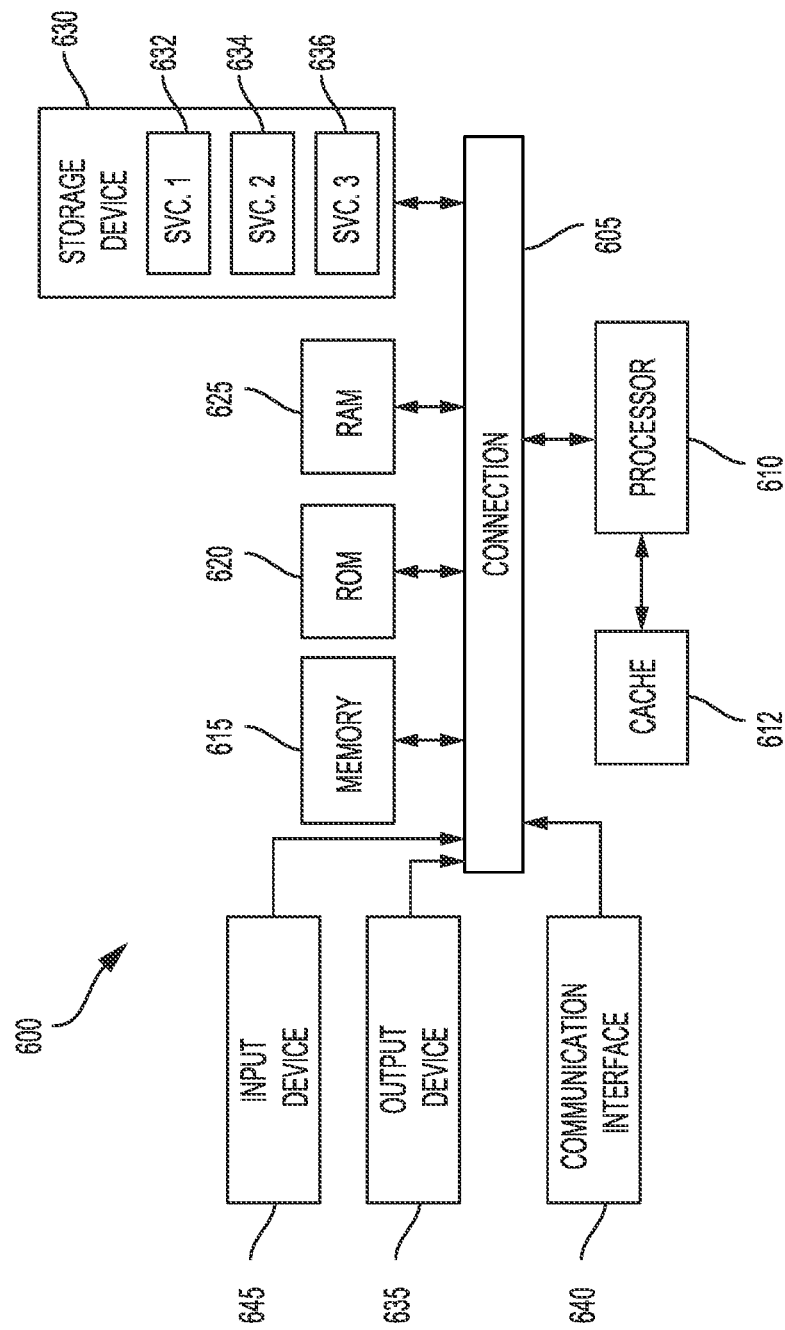
FIG. 6 illustrates an example processor-based system with which some aspects of the subject technology can be implemented.

FIG. 6 illustrates an example computing system 600 which can be, for example, any computing device making up internal computing system 110, remote computing system 150, a passenger device executing rideshare application 170, or any other computing device. In FIG. 6, the components of the computing system 600 are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
    determining a number of available operators to provide remote assistance to an autonomous vehicle;
    selecting a route from a first plurality of routes based on the number of available operators, wherein selecting the route is further based on a cost function weighting assigned to a likelihood of needing remote assistance based on the number of available operators and the selecting including changing the cost function weighting assigned to the likelihood of needing remote assistance based on the number of available operators; and
    causing the autonomous vehicle to take the route selected from the first plurality of routes.

2. The computer-implemented method of claim 1, wherein selecting the route is further based on a first optimization of trip metrics, the method further comprising:
    re-optimizing the route for a reduced adverse event likelihood; and
    causing the autonomous vehicle to take the re-optimized route.

3. The computer-implemented method of claim 1, wherein determining the number of available operators further includes determining the number of available operators to provide remote assistance to the autonomous vehicle during a specific time segment.

4. The computer-implemented method of claim 1, further comprising:
    adjusting route planner settings configured to select the route from the first plurality of routes.

5. The computer-implemented method of claim 1, wherein selecting the route is further based on performance metrics, wherein the performance metrics include time duration, number of takeovers, ride comfort, and a transit time for a lane identifier.

6. The computer-implemented method of claim 1, wherein selecting the route is further based on a predictive model of performance metrics and rates of adverse events as a function of at least one of a lane identifier and a time period.

7. A system comprising:
    one or more processors; and
    a non-transitory computer-readable medium comprising instructions stored therein, which when executed by the one or more processors, cause the one or more processors to:
        determine a number of available operators to provide remote assistance to an autonomous vehicle;
        select a route from a first plurality of routes based on the number of available operators, wherein selecting the route is further based on a cost function weighting assigned to a likelihood of needing remote assistance based on the number of available operators and the selecting including changing the cost function weighting assigned to the likelihood of needing remote assistance based on the number of available operators; and
        cause the autonomous vehicle to take the route selected from the first plurality of routes.

8. The system of claim 7, wherein selecting the route is further based on a first optimization of trip metrics, wherein the instructions, when executed by the one or more processors, further cause the one or more processors to:
    re-optimize the route for a reduced adverse event likelihood; and
    cause the autonomous vehicle to take the re-optimized route.

9. The system of claim 7, wherein determining the number of available operators further includes determining the number of available operators to provide remote assistance to the autonomous vehicle during a specific time segment.

10. The system of claim 7, wherein the instructions, when executed by the one or more processors, further cause the one or more processors to:
adjust route planner settings configured to select the route from the first plurality of routes.

11. The system of claim 7, wherein selecting the route is further based on performance metrics, wherein the performance metrics include time duration, number of takeovers, ride comfort, and a transit time for a lane identifier.

12. The system of claim 7, wherein selecting the route is further based on a predictive model of performance metrics and rates of adverse events as a function of at least one of a lane identifier and a time period.

13. A non-transitory computer-readable medium comprising instructions stored therein, which when executed by one or more processors, cause the one or more processors to:
determine a number of available operators to provide remote assistance to an autonomous vehicle;
select a route from a first plurality of routes based on the number of available operators, wherein selecting the route is further based on a cost function weighting assigned to a likelihood of needing remote assistance based on the number of available operators and the selecting including changing the cost function weighting assigned to the likelihood of needing remote assistance based on the number of available operators; and
cause the autonomous vehicle to take the route selected from the first plurality of routes.

14. The non-transitory computer-readable medium of claim 13, wherein the instructions, when executed by the one or more processors, further cause the one or more processors to:
re-optimize the route for a reduced adverse event likelihood; and
cause the autonomous vehicle to take the re-optimized route.

15. The non-transitory computer-readable medium of claim 13, wherein determining the number of available operators further includes determining the number of available operators to provide remote assistance to the autonomous vehicle during a specific time segment.

16. The non-transitory computer-readable medium of claim 13, wherein the instructions, when executed by the one or more processors, further cause the one or more processors to:
adjust route planner settings configured to select the route from the first plurality of routes.

17. The non-transitory computer-readable medium of claim 13, wherein selecting the route is further based on performance metrics, wherein the performance metrics include time duration, number of takeovers, ride comfort, and a transit time for a lane identifier.

* * * * *